CONTACT

Filed June 11, 1965

Inventors:
Edward A. Biba
Salvatore R. Novello
By Hume, Groen, Clement & Hume Attys.

United States Patent Office 3,283,288

Patented Nov. 1, 1966

3,283,288

CONTACT

Edward A. Biba, Cicero, and Salvatore R. Novello, Mount Prospect, Ill., assignors to Malco Manufacturing Company, Chicago, Ill., a corporation of Illinois Filed June 11, 1965, Ser. No. 478,501
4 Claims. (Cl. 339—193)

This is a continuation-in-part of application Serial No. 194,073, filed May 11, 1962, now abandoned, and entitled "Contact." This invention relates in general to electrical connections. It deals more particularly with improved socket contact arrangements for joining electrical components to conductors.

It is conventional practice in the electrical industries to use a socket contact arrangement for completing electrical connections between electron tubes, modules, and the like, and corresponding conductors. For example, many radio and television manufacturers utilize a printed circuit arrangement having individual solder connections for the conductors and appropriate contacts for the prongs on the module or electron tube, for example. On the other hand, some manufacturers utilize a molded contact arrangement wherein a plurality of metal contacts including prong socket contacts and conductor solder terminals are molded into Bakelite, for example.

Printed circuit arrangements or molded contacts of this type have inherent drawbacks, however. For example, since the conductor terminals are fixed in either the printed circuit arrangement or the aforedescribed molded contact, circumstances which necessitate breaking an individual solder connection frequently result in damage being done to the entire terminal. As a result, it is not uncommon for it to become necessary to discard the entire printed circuit board or molded socket. It will be seen that such a practice is relatively expensive. In addition, a printed circuit board, for example, is relatively expensive to fabricate initially. Furthermore, printed circuits have historically proven to be less reliable than conventional soldered wire circuits.

Accordingly, it is an object of the present invention to provide new and improved electrical contact arrangements for joining electronic components, such as resistors, capacitors, lead wires and the like to electron tubes, modules, or the like more economically and reliably than heretofore possible using conventional hand-wrapped and soldered connections.

It is another object to provide contact arrangements of the aforedescribed character which are easily fabricated, and are composed of a minimum of parts, each of which is relatively simple and inexpensive.

It is still another object to provide contact arrangements which facilitate rapid and highly effective connection of numerous conductors to modules or electron tubes or the like.

It is a further object to provide electrical contact arrangements which are substantially small and, accordingly, facilitate substantial reduction in size of radio and television chassis, for example.

It is yet a further object to provide contact arrangements of the aforedescribed character which permit the wiring in radio or television chassis, for example, to be followed and identified more easily than with presently known contact arrangements of a generally similar character.

It is another object to provide a molded contact arrangement wherein the terminals are individually insertable and removable at will.

The above and other objects are realized in accordance with the present invention by providing new and improved contact arrangements for joining electrical components to conductors. Briefly, the invention contemplates a predetermined arrangement of terminals removably set in a molded base of insulating material. Each terminal is unitary in construction and includes a prong socket contact and a conductor receptacle. Each terminal permits rapid conductor connections without threading and twisting the conductors prior to soldering in the manner heretofore utilized.

The invention, both as to its organization and method of operation, taken with further objects and advantages thereof, will best be understood by reference to the following description taken in connection with the accompanying drawings in which.

Figures 1, 2, 3, 4, 5, 6, 6A:
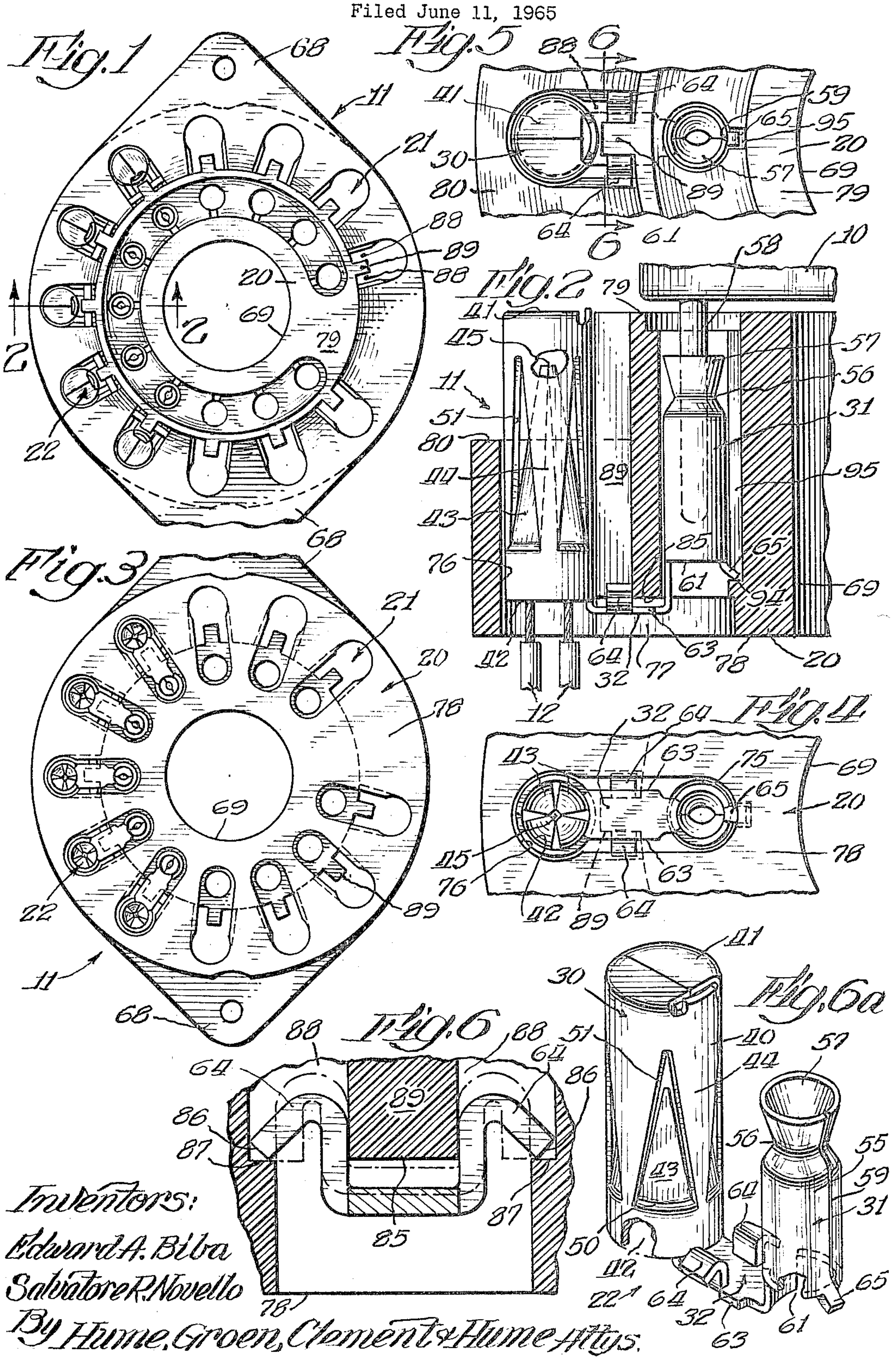
FIGURE 1 is a top plan view of a contact arrangement embodying features of a first form of the present invention, with parts removed.
FIGURE 2 is a sectional view taken along line 2—2 of FIGURE 1.
FIGURE 3 is a bottom plan view of a contact arrangement illustrated in FIGURE 1.
FIGURE 4 is an enlarged bottom plan view of a portion of the contact arrangement of FIGURES 1–3.
FIGURE 5 is an enlarged plan view of a portion of the contact arrangement illustrated in FIGURE 1, showing the terminal mounting in greater detail.
FIGURE 6 is a sectional view taken along line 6—6 of FIGURE 5.

FIGURE 6*a* is a perspective view of one of the terminals incorporated in the contact arrangement shown in FIGURES 1–3.

Referring now to the drawings, and particularly to FIGURES 1–6, an electrical contact arrangement embodying features of a first form of the present invention is illustrated generally at 11. The contact arrangement 11 seats an electron tube 10 (partially shown in FIGURE 2) and receives conductors 12 to complete circuitry in a television or radio set or the like.

The electrical contact arrangement embodies a new concept for establishing simple, relatively inexpensive and highly effective connections between components such as the electron tube 10, for example, and appropriate conductors 12. Each electrical contact arrangement 11 might be referred to as an "up-side-down" contact wherein the conductors 12 and the tube 10 enter the contact arrangement 11 from the opposite sides.

Now referring specifically to the construction of the electrical contact arrangement 11, it will be seen that the contact arrangement comprises a generally cylindrical molded plastic block 20 having a spaced series of passage arrangements 21 formed therein for receiving corresponding terminals, seen generally at 22. Referring specifically to FIGURE 6*a*, each terminal 22 is a unitary member comprising a conductor receptacle 30 and a prong socket contact 31 joined by a connecting strip 32. Each terminal 22 cooperates with a corresponding aperture arrangement 21 in the block 20 to retain the terminal in semi-permanently locked relationship in the aperture arrangement. Each terminal 22 is preferably formed of a pre-tinned brass or similar conducting material.

The conductor receptacle 30 of each terminal 22 is constructed substantially along the lines disclosed in the Maximoff et al. Patent No. 3,156,517, issued November 10, 1964, entitled "Solder Well Terminal," and assigned to the same assignee as the present invention. The receptacle 30 comprises a tubular body, seen generally at 40, having a closed end 41 and an oppositely disposed open end 42. A plurality of triangular spring fingers 43 are stamped out of the wall 44 of the body 40 and extend into immediately adjacent relationship with each other, as at 45, near the closed end 41.

Each of the fingers 43 remains connected to the wall 44 at its base 50, where the fingers are offset slightly inwardly. In other words, each of the fingers 43 bends very slightly inwardly before it protrudes toward the closed end 41 of the body 40. When a plurality of the conductors 12 are inserted in the receptacle 30, the fingers 43 are forced outwardly by the passage of the conductors, whereupon they resiliently retain the conductors in the receptacle.

By providing an offset at the base 50 of each finger 43, the fingers are displaced longitudinally from the edges 51 of the apertures which remain when the fingers are blanked out of the walls 44 and, consequently, the fingers do not engage the edges 51 as they are forced outwardly. As a result, the fingers 43 are free to press inwardly against the conductors 12 to securely retain them. When the conductors 12 have been introduced to the receptacles 30, solder is introduced to fix the conductors therein and establish good electrical contact therebetween.

Turning to the prong socket contact 31, it will be seen to comprise an elongated circular cylindrical body 55 having a necked down section 56 adjacent its upper end providing a frusto-conical mouth 57 for receiving a tube prong 58. The body 55 has a longitudinally extending seam 59 running along its entire length and the internal dimensions of the necked down section 56 are such that when the prong 58 of a tube 10 enters the frusto-conical mouth 57 of the contact 31, the contact 31 expands radially to provide resilient retention force for holding the prong 58 and, accordingly, the tube 10. The connecting strip 32 joining the conductor receptacle 30 and the contact 31 extends transversely between the open end 42 of the receptacle body and the open end 61 of the contact body 55 opposite the mouth 57. Extending transversely of the strip 32, outwardly of its side edges 63, are ears 64 for retaining the connector 22 in the aperture arrangement 21. In addition, a lip 65 is formed on the open end 61 of the contact body 55 for assisting the ears 64 in retaining the connector 22 in the molded block 20.

The molded plastic block 20 which receives a plurality of terminals 22 in corresponding aperture arrangements 21 might be formed of Bakelite or the like. The generally cylindrical block 20 has a projection 68 extending from each side to provide an anchoring means for securing the contact arrangement 11 to a frame member (not shown) in a television set, for example. A centrally disposed passage 69 extends through the block 20 and could also be used for securing the contact arrangement 11 to a television chassis or the like. In actual practice, however, the passage 69 is frequently utilized as a receptacle for a conventional locking tube (not shown) which in turn, functions as a means for terminating various electrical components.

As best seen in FIGURES 1 and 3, the aperture arrangements 21, of which there are twelve in the present illustration, are disposed in an annular pattern around the block 20. Each aperture arrangement 21 includes a radially inner passage 75 and a radially outer passage 76 extending parallel to each other on an axis disposed parallel to the central axis of the generally cylindrical block.

Each passage 75 and 76 extends entirely through the block 20. In this light, the passages 75 and 76 terminate at their lower ends in a radially extending channel 77 in the lower face 78 of the block. On the other hand, the upper end of each passage 75 terminates in the upper face 79 of the block 20 while the upper end of each passage 76 terminates partially in the upper face 79 and partially on a recessed ledge 80 extending around the periphery of the block.

To seat a contact arrangement 22 in an aperture arrangement 21, the necked down end of the contact 31 and the closed end 41 of the receptacle 30 are directed into their respective passages through the channel 77 in the lower face 78 of the block 20. The connector 22 is pressed into the aperture arrangement 21 until the strip 32 is flush against the base 85 of the channel 77. As the connector is forced into this position, the lips 86 of the ears 64 are sprung into collapsed relationship (see dotted lines in FIGURE 6) until they have passed corresponding shoulders 87 formed in the lower ends of slots 88 bracketing a rib 89 extending from the upper surface 79 of the block through to a corresponding channel 77.

With a contact arrangement 22 forced into a receiving aperture arrangement 21 to the point where the connecting strip 32 is flush against the base 85 in the channel 77, as illustrated in FIGURE 6, the lips 86 of the ears 64 spring outwardly into the solid line position of FIGURE 6, under the shoulders 87.

At the same time, the lip 65 on the contact 31, which has also been forced inwardly, springs out under a shoulder 94 in the passage 75. The shoulder 94 is, as will be noted, the lower terminus of a slot 95 extending from the upper surface 79 of the block 20 down to the shoulder.

With the lips 86 of the ears 64 on the connecting strip 32 sprung outwardly underneath the shoulders 87, and the lip 65 on the contact 31 spring outwardly underneath the shoulder 94, it will be seen that the contact arrangement 22 is securely retained in the corresponding aperture arrangement 21. Furthermore, once the lips 87 and 65 are sprung outwardly in this manner, a certain amount of axial play and, accordingly, looseness, is afforded the contact arrangement 22 in the aperture arrangement 21. Accordingly, the contact 31 is able to adjust itself slightly to properly receive a corresponding prong 60 on the tube 10 and provide optimum electrical contact between the tube and the contact arrangement 22.

If it is desirable to remove a contact arrangement 22 because the contact arrangement is damaged, for example, the connecting strip 32 is merely forced upwardly in the aperture arrangement 21 until it seats flat against the base 85 in the channel 77. Suitable tools are then inserted in the slots 88 from the upper surface 79 of the block 20 to force the lips 86 of the ears 64 inwardly into their dotted line position as seen in FIGURE 6, once more. A similar tool is inserted in the slot 95 of the passage to force the lip 65 inwardly in the ledge 94. The contact arrangement 22 is then easily withdrawn from the passage arrangement 21 through the channel 77 in the lower surface 78 of the block 20.

What is desired to be claimed in Letters Patent of the United States is:

1. A contact arrangement for joining the prongs of an electrical component to conductor means, comprising: a generally cylindrical body of insulating material having an upper face and a lower face and a series of aperture means spaced around its periphery and extending between said faces, each aperture means comprising a radially inner passage and a radially outer passage and a partition separating said passages, an electrical terminal mounted in each of said aperture means, each of said terminals including a conductor wire receptacle seated in an outer passage and a prong receiving contact seated in a corresponding inner passage, a channel in said lower face connecting said passages in each aperture means, each of said terminals further including a connecting strip joining a corresponding conductor wire receptacle and contact and extending through a corresponding channel, a rib in each outer passage extending radially out from a corresponding partition and dividing a portion of said outer passage into a pair of slots spaced circumferentially of said body, said slots communicating with said upper face and a corresponding channel, shoulder means formed adjacent said lower face and overlying a portion of each of said slots, and ear means formed on each of said connecting strips for resiliently snapping behind corresponding shoulder means when said terminals are inserted in said aperture means through said channels and said lower face, said ribs forming supports for said connecting strips, said slots providing access to said ears from said upper face to facilitate resiliently forcing said ears from behind said shoulder means to permit removing each terminal.

2. The contact arrangement of claim 1 further characterized in that a lip is formed on each contact and a cooperating shoulder formed in each inner passage adjacent said lower face, said lips resiliently snapping behind said cooperating shoulders to assist in retaining said contacts in said body.

3. The contact arrangement of claim 21 further characterized by and including a slot formed in each of said inner passages extending between said upper surface and cooperating shoulder, whereby access may be gained to said contact lip for releasing it from behind said cooperating shoulder.

4. The contact arrangement of claim 1 further characterized in that said conductor receptacles are open adjacent said one face of said block for receiving conductor means and said prong receiving contacts are open adjacent the opposite face of said block for receiving the prongs of an electrical component.

References Cited by the Examiner

UNITED STATES PATENTS

| | | | |
|---|---|---|---|
| 2,332,483 | 10/1943 | Doty | 339—193 |
| 2,453,826 | 11/1948 | Adams | 339—193 |
| 2,694,799 | 11/1954 | Del Camp | 339—193 X |
| 2,745,080 | 5/1956 | Offerman | 339—275 X |
| 2,796,593 | 6/1957 | Offerman | 339—220 |
| 3,031,635 | 4/1962 | Gluck | 339—193 X |
| 3,131,988 | 5/1964 | Jensen et al. | 339—193 |
| 3,147,060 | 9/1964 | Jensen et al. | 339—220 X |
| 3,187,296 | 6/1965 | Brackett | 339—217 |

EDWARD C. ALLEN, *Primary Examiner.*

W. DONALD MILLER, *Examiner.*

UNITED STATES PATENT OFFICE

CERTIFICATE OF CORRECTION

Patent No. 3,283,288 November 1, 1966

Edward A. Biba et al.

It is hereby certified that error appears in the above numbered patent requiring correction and that the said Letters Patent should read as corrected below.

Column 5, line 6, for the claim reference numeral "21" read -- 2 --.

Signed and sealed this 5th day of September 1967.

(SEAL)
Attest:

ERNEST W. SWIDER
Attesting Officer

EDWARD J. BRENNER
Commissioner of Patents